(12) United States Patent
Williams et al.

(10) Patent No.: US 10,580,028 B1
(45) Date of Patent: Mar. 3, 2020

(54) SYSTEMS AND METHODS FOR REWARDS INTEGRATION AS A FUNDING ACCOUNT

(71) Applicant: Wells Fargo Bank, N.A., San Francisco, CA (US)

(72) Inventors: Raissa Williams, San Francisco, CA (US); Priya Ramakrishnan, Dublin, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 275 days.

(21) Appl. No.: 15/392,435

(22) Filed: Dec. 28, 2016

(51) Int. Cl.
 *G06Q 30/00* (2012.01)
 *G06Q 30/02* (2012.01)
(52) U.S. Cl.
 CPC ..... *G06Q 30/0233* (2013.01); *G06Q 30/0215* (2013.01)
(58) Field of Classification Search
 None
 See application file for complete search history.

(56) References Cited

U.S. PATENT DOCUMENTS

| | | | |
|---|---|---|---|
| 7,828,206 B2 | 11/2010 | Hessburg et al. | |
| 8,408,455 B1 | 4/2013 | Taylor et al. | |
| 8,510,158 B2 | 8/2013 | Postrel | |
| 8,533,036 B2 | 9/2013 | Shukla et al. | |
| 8,533,037 B2 | 9/2013 | Postrel | |
| 8,682,791 B2 | 3/2014 | Bies et al. | |
| 8,684,265 B1 | 4/2014 | McGhie et al. | |
| 8,831,976 B2 | 9/2014 | Sprogoe et al. | |
| 9,141,948 B2 | 9/2015 | Dickelman | |
| 2006/0027647 A1* | 2/2006 | Deane | G06K 19/08 235/380 |
| 2008/0103968 A1* | 5/2008 | Bies | G06Q 20/06 705/39 |
| 2008/0133351 A1* | 6/2008 | White | G06Q 20/387 705/14.27 |
| 2009/0265241 A1 | 10/2009 | Bishop et al. | |
| 2010/0042517 A1* | 2/2010 | Paintin | G06Q 30/02 705/30 |

(Continued)

OTHER PUBLICATIONS

Wirtz, Jochen, "How Effective are Loyalty Reward Programs in Driving Share of Wallet?" Marketeers, Nov. 2010. 2 pages.

*Primary Examiner* — Matthew T Sittner
(74) *Attorney, Agent, or Firm* — Foley & Lardner LLP

(57) ABSTRACT

Systems, methods, and apparatuses for processing a rewards transaction including an accounts database storing information associated with accounts held by a financial institution including a payment account associated with a customer, a rewards account database storing information associated with reward accounts, including a rewards account associated with the customer, and a processing circuit. The processing circuit is structured to receive transaction details that define a rewards transaction associated with the rewards account, receive a rewards transaction request associated with the rewards account, the rewards transaction request including a rewards amount and recipient details, debit an amount of points from the rewards account maintained by the financial institution and associated with the customer, where the amount of points are less than or equal to the rewards amount, and complete the rewards transaction without converting the rewards amount to currency.

15 Claims, 6 Drawing Sheets

(56) References Cited

U.S. PATENT DOCUMENTS

| | | | | |
|---|---|---|---|---|
| 2010/0057553 A1* | 3/2010 | Ameiss | ............... | G06Q 20/387 |
| | | | | 705/14.32 |
| 2010/0211469 A1* | 8/2010 | Salmon | ............... | G06Q 20/387 |
| | | | | 705/16 |
| 2012/0191525 A1* | 7/2012 | Singh | ............... | G06Q 30/0226 |
| | | | | 705/14.33 |
| 2013/0030996 A1* | 1/2013 | MacKouse | ........... | G06Q 20/102 |
| | | | | 705/40 |
| 2014/0081736 A1* | 3/2014 | Blackhurst | ........... | G06Q 20/342 |
| | | | | 705/14.28 |
| 2014/0164091 A1* | 6/2014 | Hunt | ................. | G06Q 30/0222 |
| | | | | 705/14.32 |
| 2014/0180849 A1 | 6/2014 | Kimberg et al. | | |
| 2015/0066748 A1 | 3/2015 | Winslow et al. | | |
| 2015/0363810 A1* | 12/2015 | Kim | ................. | G06Q 30/0215 |
| | | | | 705/14.17 |
| 2016/0027034 A1 | 1/2016 | Kim | | |
| 2019/0005558 A1* | 1/2019 | Morris | ................. | G06Q 30/02 |

\* cited by examiner

SYSTEMS AND METHODS FOR REWARDS INTEGRATION AS A FUNDING ACCOUNT

TECHNICAL FIELD

Embodiments of the present disclosure relate generally to the field of redeeming rewards.

BACKGROUND

Many issuers of credit cards offer rewards points to customers. For example, some credit card issuers provide one reward point for every dollar spent on the credit card. Accordingly, as a customer continues to use a rewards credit card, the customer accumulates rewards points. The customer can then redeem the rewards points. Some credit cards restrict how the accumulated rewards points can be redeemed. For example, some rewards points can only be used for a statement credit or as cash back, while other rewards points can only be used to purchase goods and services from a rewards catalog.

SUMMARY

A first example embodiment relates to a system. The system includes an accounts database storing information associated with accounts held by a financial institution including a payment account associated with a customer, a rewards account database storing information associated with reward accounts, including a rewards account associated with the customer, and a processing circuit. The processing circuit is structured to receive transaction details that define a rewards transaction associated with the rewards account, receive a rewards transaction request associated with the rewards account, the rewards transaction request including a rewards amount and recipient details, debit an amount of points from the rewards account maintained by the financial institution and associated with the customer, where the amount of points are less than or equal to the rewards amount, and complete the rewards transaction without converting the rewards amount to currency.

Another example embodiment relates to a method of performing a rewards transaction. The method includes receiving, by a financial institution computing system, a rewards transaction request associated with a rewards account, the rewards transaction request including a rewards amount and recipient details, debiting, an amount of points from the rewards account maintained by the financial institution and associated with the customer, wherein the amount of points is less than or equal to the rewards amount, and completing the rewards transaction without converting the rewards amount to currency.

A further example embodiment relates to an apparatus. The apparatus includes a transaction processing circuit and an account management circuit included in a financial institution computing system associated with a financial institution. The transaction processing circuit is configured to receive a rewards transaction request associated with the rewards account, the transaction request including a rewards amount and recipient details. The account management circuit is configured to debit an amount of points from the rewards account maintained by the financial institution and associated with the customer, where the amount of points is less than or equal to the rewards balance.

These and other features, together with the organization and manner of operation thereof, will become apparent from the following detailed description when taken in conjunction with the accompanying drawings.

DETAILED DESCRIPTION

Figure 1:
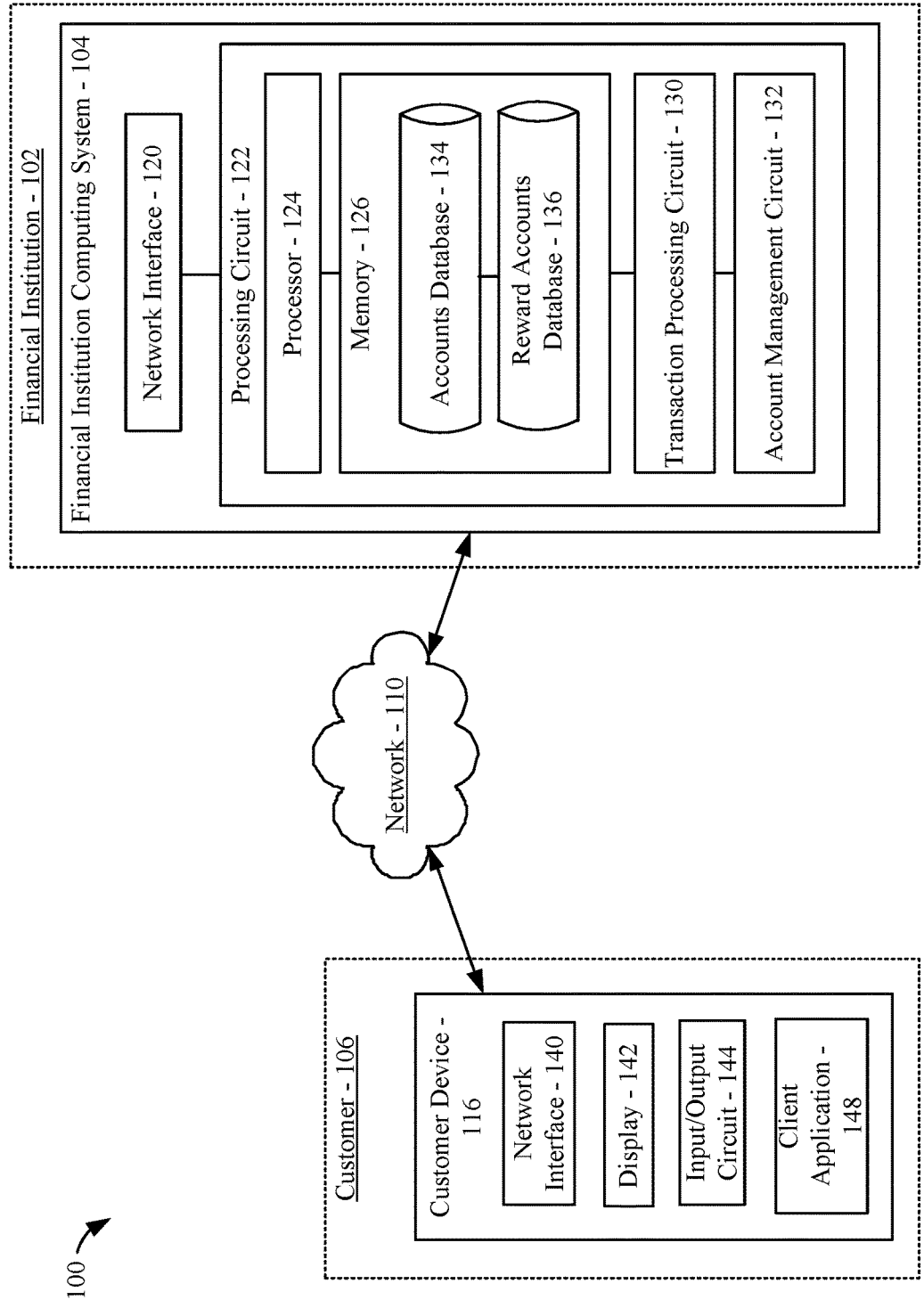
FIG. 1 is a block diagram of a rewards transaction system, according to an example embodiment.

Referring to the figures generally, systems, methods, and apparatuses for performing a rewards transaction are described herein. A customer of a financial institution having a rewards account associated with a payment account can perform transactions with points instead of currency without the need to first convert the points to currency. To perform the transaction using reward points, the customer selects a designated rewards account as a funding account for a transaction and enters rewards transaction details using the customer device. After selecting a rewards account as a funding account for a transaction and entering rewards transaction details using the customer device, the financial institution checks the rewards balance to see if the rewards transaction can be performed and processes the transaction as a rewards transaction without first converting the rewards to currency.

As used herein, "points" refers to rewards issued by a financial institution to a customer that can be redeemed through the financial institution and/or exchanged into currency by the financial institution at an exchange rate that is defined by the financial institution. In some arrangements, points are not generally accepted outside of the financial institution, and thus, have no value outside of the financial institution. In other arrangements, points maintain a value to institutions other than the financial institution. "Currency" refers to fiat currency (e.g., U.S. Dollars, Euros, etc.) or other forms of generally accepted money (e.g., math-based currencies, crypto currencies, etc.) that are not issued by the financial institution and that can be used by the customer directly to make purchases, pay bills, make withdrawals, etc.

An example implementation may be described as follows. A customer opens a banking application on a mobile device. The customer logs into the banking application and selects an option to make a transfer in currency (e.g., U.S. Dollars) to another individual (e.g., in a peer-to-peer transfer) that is funded with reward points. The customer may first view a reward points balance to ensure that the balance is sufficient to cover the transfer transaction. The customer enters the transfer transaction details including the recipient name, transfer amount, and may select the account to use for the transaction. The customer may enter the transfer amount in either reward points or currency. Accordingly, the customer may toggle between reward point and currency amounts if desired. If the customer enters a transfer amount that is higher than the reward points balance, the application will notify the customer that there are insufficient funds to complete the transaction and will prompt the customer to enter a lower amount of reward points and/or currency or to cancel the transaction. When the customer enters an amount of reward points that is lower than the total amount of the transaction, the application will display a corresponding currency amount indicating the amount of currency needed to cover the remainder of the transaction if the reward points are first applied. If the customer enters the lower amount of reward points and selects the submit option on the application, the transaction is processed with the lower amount of reward points plus the currency remainder amount displayed to the customer. In some arrangements when there are insufficient rewards points to fund the transfer, the customer may be presented the option to partially fund the transaction with rewards and to fund the difference with a currency source (e.g., a checking account, a credit card, etc.). In some arrangements, the transaction is processed without first converting the reward points to currency.

Referring to FIG. 1, a block diagram of a rewards transaction system 100 is shown according to an example embodiment. Generally, the system 100 facilitates a transaction by a customer 106 (e.g., a peer-to-peer transfer from the customer 106 to another user) using points from a rewards account associated with the customer and maintained by a financial institution 102. In some arrangements, the rewards account is associated with a payment account (e.g., a credit account, a line of credit, a demand deposit account, a prepaid account, etc.) maintained by the financial institution 102. In such arrangements, the customer 106 may accrue points in the rewards account by paying for purchases from the payment account, paying off balances associated with the payment account, and/or promotions associated with the payment account. For example, the payment account may be a credit account in which the customer 106 earns a certain number of points for every dollar spent with the credit account (e.g., one point for one dollar, two points for one dollar, a certain percentage of the amount of purchases made, etc.) and/or a certain number of points for every dollar of balance paid off. Through the system, the customer 106 can complete transactions using reward points via the customer device 116 without having to first convert the reward points to currency.

Referring to FIG. 1, the system 100 includes a financial institution computing system 104 associated with a financial institution 102, where the financial institution computing system 104 is communicably and operatively coupled to a customer device 116 associated with a customer 106, over a network 110. The network 110 provides communicable and operative coupling between the customer device 116 and the financial institution computing system 104, and other components disclosed and described herein to provide and facilitate the exchange of communications (e.g., data, instructions, messages, values, commands, etc.). Accordingly, the network 110 may include any network including wired (e.g., Ethernet) and/or wireless networks (e.g., 802.11X, ZigBee, Bluetooth, WiFi, etc.). In some arrangements, the network 110 includes the Internet. In further embodiments, the network 110 includes a proprietary banking network to provide secure or substantially secure communications.

The customer device 116 includes any type of computing device that may be used to facilitate reward transactions at a financial institution 102. In some arrangements, the customer uses the customer device 116 to perform reward transactions. The customer device 116 may include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. The customer device 116 may also include any type of mobile device including, but not limited to, a phone (e.g., smartphone, etc.), and/or any type of computing devices (e.g., desktop computer, laptop computer, personal digital assistant, etc.).

The customer device 116 further includes a display 142, an input/output circuit 144, a network interface 140, and a client application 148. The network interface 140 of the customer device 116 is adapted for and configured to establish a communication session via the network 110 with the financial institution computing system 104. Accordingly, the network interface 140 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 142 is used to present rewards account information, payment account information, transaction information, and the like. The display 142 is further used to present transaction prompts and confirmations to the customer 106. In this regard, the display 142 is communicably and operatively coupled to the input/output circuit 144 to provide a user interface for receiving and displaying information on the customer device 116.

The input/output circuit 144 is structured to receive and provide communication(s) to a user of the customer device 116. In this regard, the input/output circuit 144 is structured to exchange data, communications, instructions, etc., with an input/output component of the customer device 116. Accordingly, in one embodiment, the input/output circuit 144 includes an input/output device such as a display device, a touchscreen, a keyboard, and a microphone. In another embodiment, the input/output circuit 144 may include communication circuitry for facilitating the exchange of data, values, messages, and the like between an input/output device and the components of the user device 170. In yet another embodiment, the input/output circuit 144 may include machine-readable media for facilitating the exchange of information between the input/output device and the components of the customer device 116. In still another embodiment, the input/output circuit 144 may include any combination of hardware components (e.g., a touchscreen), communication circuitry, and machine-readable media.

The client application 148 is communicably coupled to the financial institution computing system 104 (e.g., the accounts database 134, reward accounts database 136) via the network 110 and is structured to permit management of the customer's accounts (e.g., payment accounts, reward accounts) via the client application 148. In this regard, the client application 148 may provide displays indicative of current account balances, pending transactions, profile information (e.g., contact information), and the like. Further, in some embodiments, the client application 148 may also permit payments to and/or from the customer 106 to a designated recipient. For example, the client application 148 may depict a loan of a customer (e.g., mortgage) and allow the user to pay the mortgage from one of their accounts (e.g., checking or savings). In another example, a bill pay option may be provided by the client application 148, where the bill pay option allows the user to pay his/her bills. In any of these examples, the client application 148 may permit the user to complete a transfer transaction (e.g., peer-to-peer (P2P)), where the transaction includes an option to transfer reward points (e.g., as currency) to another individual using a rewards account as the funding account.

Still referring to FIG. 1, the financial institution computing system 104 is associated with the financial institution 102. The financial institution 102 may be, for example, a credit card issuer, a bank, or the like. The financial institution computing system 104 includes a processing circuit 122 having a processor 124 and a memory 126. The processor 124 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 126 (e.g., RAM, NVRAM, ROM, Flash Memory, hard disk storage, etc.) may store data and/or computer code for facilitating the various processes described herein. Moreover, the one or more memory devices 126 may be or include tangible, non-transient volatile memory or non-volatile memory. Accordingly, the one or more memory devices 126 may include database components, object code components, script components, or any other type of information structure for supporting the various activities and information structures described herein.

The financial institution computing system 104 further includes a network interface 120, which is used to establish connections with other components of the system 100 by way of network 110. The network interface 120 includes program logic that facilitates connection of the financial institution computing system 104 to the network 110. The network interface 120 supports communication between the financial institution computing system 104 and other systems, such as the customer device 116. For example, the network interface 120 includes a cellular modem, a Bluetooth transceiver, a Bluetooth beacon, a radio-frequency identification (RFID) transceiver, and a near-field communication (NFC) transmitter. In some embodiments, the network interface 120 communicates via a secured wired connection within a branch of the financial institution 102. In some arrangements, the network interface 120 includes the hardware and machine-readable media sufficient to support communication over multiple channels of data communication. Further, in some arrangements, the network interface 120 includes cryptography capabilities to establish a secure or relatively secure communication session with the financial institution computing system 104. In this regard, financial data (or other types of data) may be encrypted and transmitted to prevent or substantially prevent the threat of hacking.

The financial institution computing system 104 further includes an accounts database 134. The accounts database 134 is configured to hold, store, categorize, and otherwise serve as a repository for information associated with accounts held by the financial institution 102. For example, the accounts database 134 may store account numbers, account balances, account ownership information, and the like. The accounts database 134 may further store information regarding reward accounts associated with payment accounts held at the financial institution 102. For example, the accounts database 134 can include which reward accounts are associated with which payment accounts at the financial institution 102. The accounts database 134 is structured to selectively provide access to information relating to an account at the financial institution 102. In this regard, as discussed further herein, the accounts database 134 is communicably and operatively coupled to the account management circuit 132 and transaction processing circuit 130 such that the system 100 may facilitate reward transactions, including P2P transfers using reward points. Although shown as being part of the memory 126, in some arrangements, the accounts database 134 is a separate component of the financial institution computing system 104.

The financial institution computing system 104 further includes the reward accounts database 136. The reward accounts database 136 is configured to hold, store, categorize, and otherwise serve as a repository for information associated with reward accounts held by the financial institution 102. For example, the reward accounts database 136 may store reward account numbers, reward account balances, reward account ownership information, and the like. The reward accounts database 136 may further store information regarding payment accounts associated with reward accounts held at the financial institution 102. For example, the reward accounts database 136 can include which reward accounts are associated with which payment accounts at the financial institution 102. The reward accounts database 136 is structured to selectively provide access to information relating to a reward account at the financial institution 102. In this regard, as discussed further herein, the reward accounts database 136 is communicably and operatively coupled to the account management circuit 132 and transaction processing circuit 130 such that the system 100 may facilitate reward transactions, including P2P transfers using reward points. Although shown as being part of the memory 126, in some arrangements, the reward accounts database 136 is a separate component of the financial institution computing system 104.

The financial institution computing system 104 includes a transaction processing circuit 130 and an account management circuit 132. Although FIG. 1 shows the transaction processing circuit 130 and the account management circuit 132 as part of the processing circuit 122, in other arrangements one of or both of the transaction processing circuit 130 and/or the account management circuit 132 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The transaction processing circuit 130 is structured to process transaction requests associated with reward accounts of customers of the financial institution 102. The transaction processing circuit 130 is structured to receive transaction requests directly from the customer 106 (e.g., via the client application 148 of the customer device 116, via an ATM, via a banking website of the financial institution 102). In one example, the transaction request is for a points-to-currency transfer from a customer 106 to another customer of the financial institution 102 (e.g., P2P transfer). In another example, the transaction request is for a transfer from a customer 106 to a non-customer. To complete a transfer transaction using reward points, the transaction requests can include recipient name, phone number, email address, account number, transfer amount (e.g., in cash and/or reward points), etc. If the transfer transaction is to a non-customer of the financial institution 102, the transaction request can also include the financial institution information of the non-customer (e.g., recipient identification, recipient financial institution routing number, account information, etc.). Although shown as being part of the processing circuit 122, the transaction processing circuit 130 may be a stand-alone circuit having its own processor and memory.

In another example, the transaction request is for a bill pay transaction to a utility company of the customer 106. In this case, the transaction request can include a bill pay recipient (e.g., utility provider, mortgage, student loan provider, etc.) name, address, service account number, bill pay amount (e.g., in cash and/or reward points), etc. In still another example, the transaction request is for a loan payment. In this case, the transaction request can include a loan payment recipient (e.g., loan service, etc.), service account number, loan payment amount (e.g., in cash and/or reward points), etc. In other examples, the transaction request can be for any transaction completed using reward points as a form of currency and can include any details necessary to complete the transaction request.

The transaction processing circuit 130 is also structured to compare the transaction amount (e.g., transfer amount, bill pay amount, loan payment amount, etc.) to the available reward balance in the reward account to determine that there are sufficient reward points to complete the requested transaction. Accordingly, the transaction processing circuit 130 is communicably and operatively coupled to the reward accounts database 136 to retrieve reward account balances. For example, the transaction processing circuit 130 receives a transaction request from a customer device 116 including a transfer transaction request indicating the transfer amount to be 10,000 reward points or an equivalent currency amount (e.g., $100). The transaction processing circuit 130 retrieves the reward account information from the reward accounts database 136 to determine the reward account balance. If the transaction processing circuit 130 determines that there are sufficient funds in the reward account, the transaction processing circuit 130 initiates the requested transaction (e.g., transfer 10,000 points). In some arrangements, the transaction processing circuit 130 initiates the transaction without converting the points amount to a currency amount such that 10,000 points are transferred as currency to an account of the transfer recipient (e.g., payee). For example, a transfer of 10,000 points from the customer 106 to a recipient is processed as a debit of 10,000 points from the customer's rewards account and a deposit of $100 to the recipient, as opposed to a first transaction that converts the 10,000 points into currency still held by the customer 106, and then a second transaction that transfers the currency from the customer 106 to the recipient. In other arrangements, the transaction processing circuit 130 converts the points to currency (e.g., US dollars) for deposit into a currency account of the transfer recipient.

Upon determining that a reward account balance is insufficient to complete a transaction, the transaction processing circuit 130 is further structured to generate and transmit a message to the customer device 116 prompting the customer 106 to complete the transaction using less reward points and/or complete the transaction using partial reward points and partial currency. Accordingly, the transaction processing circuit 130 sends the message to the customer device 116 (e.g., via the client application 148), where the message includes a notice that the transaction cannot be completed using only reward points. In some arrangements, the message may include an available reward points balance. In further arrangements, the message may also include a prompt for the customer 106 to enter a lower reward points amount to use instead of the originally requested amount. In some arrangements, the message includes a cash remainder value, where the cash remainder value shows the amount of currency needed to cover the difference between the reward points amount entered and the transaction amount (e.g., transfer amount, bill pay amount, etc.). Accordingly, the transaction processing circuit 130 gives the customer 106 the option to complete a split-funding source transfer. For example, the customer 106 can transfer currency to a recipient using partial reward points and partial currency (e.g., transfer of $100 using a combination of 5,000 reward points and $50).

In cases where the reward account balance is insufficient to complete the transaction, the transaction processing circuit 130 is configured to receive an indication of a lesser reward points amount to use in place of the originally requested reward points amount. Upon receiving the lesser reward points amount, the transaction processing circuit 130 determines the cash remainder amount and generates and transmits the cash remainder amount for display on the customer device 116. The cash remainder amount is displayed as a currency amount necessary to cover the difference between the reward points amount and the transaction amount (e.g., transfer amount, bill pay amount, etc.). In some arrangements, when the customer 106 uses the customer device 116 (e.g., via client application 148) to adjust the amount of reward points the customer 106 desires to use for the transaction, the cash remainder amount is updated in real-time to reflect the difference between the reward points amount and the transaction amount. For example, the transaction request is for a transfer of 10,000 points, which, in the example, is equivalent to $100. The customer rewards account indicates a balance of 5,000 points. To complete the transfer, the transaction processing circuit 130 requests the customer 106 enter a rewards amount of or below 5,000 points. If the customer enters 5,000 points, the generated cash remainder value is displayed as $50, or the difference between the transaction amount of 10,000 points (e.g., $100) and the reward points amount of 5,000 points (e.g., $50). If the customer instead enters 4,000 points, the generated cash remainder value is displayed as $60, and so on.

The transaction processing circuit 130 is structured to initiate the transaction request. Upon receiving an indication to complete the transaction request from the customer device 116 (e.g., via the client application 148), the transaction processing circuit 130 initiates the payment, funds transfer, etc., and communicates with the account management circuit 132 to update the customer accounts held with the financial institution 102.

The account management circuit 132 is structured to perform various account management functions, including maintaining an accounts database 134, maintaining a reward accounts database 136, updating account balances, applying interest to accounts, processing payments related to accounts, and the like. The account management circuit 132 is structured to receive communication from the transaction processing circuit 130 that a transaction is or will be completed. The account management circuit 132 is configured to communicate with the reward accounts database 136 to update the reward account balance of the customer 106 to reflect the completed transaction. For example, before completion of the transaction, the reward account balance was 15,000 points. The transaction request included a transfer of 10,000 points (e.g., $100) to another individual. To reflect the transfer amount, the account management circuit 132 updates the reward account balance to reflect 10,000 less points, thus update the balance to 5,000 points. Although shown as being part of the processing circuit 122, the account management circuit 132 may be a stand-alone circuit having its own processor and memory.

In some arrangements where the customer 106 has entered a reward points amount below the total transaction amount, the account management circuit 132 communicates with both the reward accounts database 136 and the accounts database 134 to update the account balances of the customer 106 to reflect the completed transaction. For example, the customer chooses to use a reward points amount of 5,000 points and a currency amount of $50 to complete a transfer of 10,000 points (e.g., or $100) to another individual. The account management circuit 132 updates a reward account balance of the customer 106 to reflect 5,000 less points and updates a currency account balance of the customer 106 to reflect $50 less in currency.

In some arrangements, the customer's currency account is debited in the same manner as done during a traditional, currency-only transaction, and the financial institution computing system 104 provides a credit to the currency account (e.g., a statement credit, a balance credit, etc.) to offset at least a portion of the transaction amount. For example, instead of debiting the 5,000 points from the reward account balance of the customer 106, the account management circuit 132 debits the entire $100 from the currency account of the customer 106. The account management circuit 132 then debits the reward account balance to reflect the reward points amount and updates the currency account to reflect a credit to the account (e.g., equivalent to the reward points amount).

Figure 2:
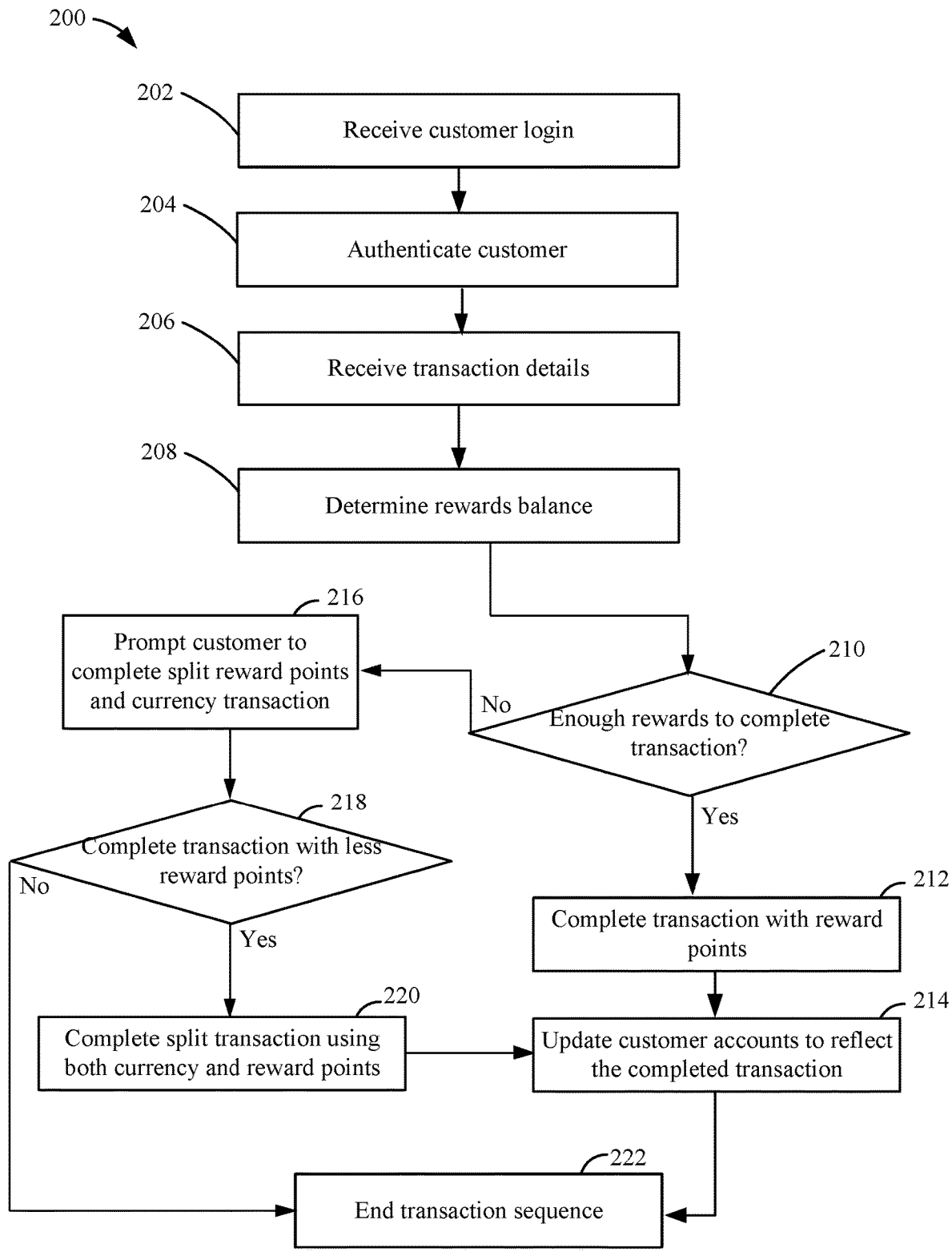
FIG. 2 is a view of a flow diagram of a method of processing a rewards transaction, according to an example embodiment.
Figure 3:
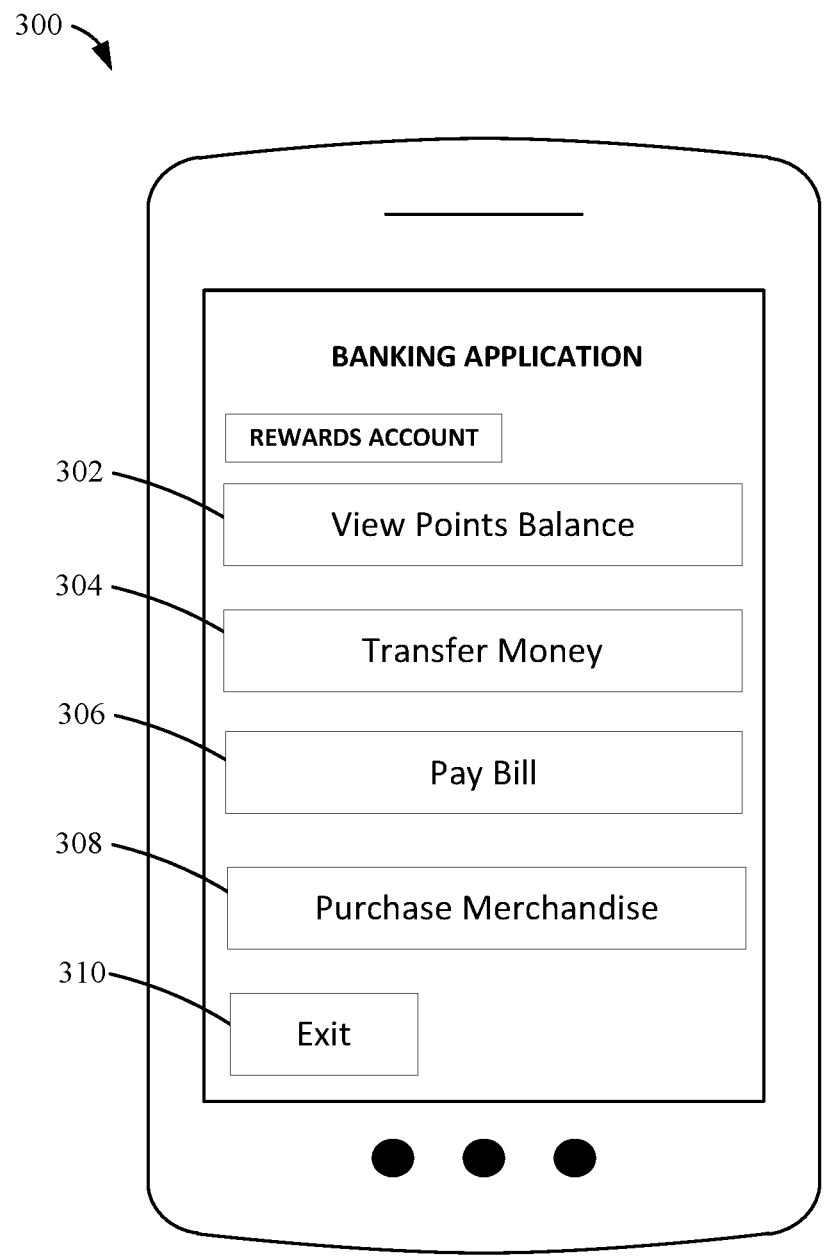
FIGS. 3 through 6 show various user interfaces of a customer device during a rewards transaction process as described in the method of FIG. 2.

Referring to FIG. 2, a flow diagram of a method 200 of processing a rewards transaction is shown according to an example embodiment. The method 200 is performed by the financial institution computing system 104 (e.g., via the transaction processing circuit 130 and the account management circuit 132). Through the method 200, the financial institution computing system 104 allows customers (e.g., the customer 106) to perform rewards transactions instead of currency transactions.

A customer login is received at 202. The customer login is received at the financial institution computing system 104 from the customer 106. The login may be received from the customer device 116 (e.g., through an online banking website, through the client application 148), via an ATM, or the like. The login relates to an attempt by the customer 102 to access a banking portal associated with the customer's accounts held at the financial institution 106. In some arrangements, the login request includes authentication information associated with the customer 106 (e.g., username, password, biometric information, device identifier, etc.). The financial institution computing system 118 compares the received authentication information against verified authentication information associated with the customer 106 to authenticate the customer 106. If the customer 106 is authenticated, access to a banking portal is provided at 204. The banking portal allows the customer 106 to complete a rewards transaction.

Transaction details are received at 206. The transaction details are input by the customer 106. The transaction details are entered into the customer device 116, an ATM, or the like. The transaction details can include the type of transaction, such as a transfer of points, transfer of currency, bill pay, loan payment, etc., a transaction amount, account information, such as from which account to draw funds (e.g., rewards account, currency account, etc.), date of transaction, and so on. The transaction details can also include recipient details, including the recipient name, account number, email address, physical address, phone number, and so on.

A rewards balance is determined at 208. In some arrangements, the rewards balance is determined by the transaction processing circuit 130. In some arrangements, the transaction processing circuit 130 receives the transaction request, including the transaction details, from a customer device 116 including a transfer transaction request indicating the transfer amount to be 10,000 reward points or an equivalent currency amount (e.g., $100). The transaction processing circuit 130 retrieves the reward account information from the reward accounts database 136 to determine the reward account balance.

The reward points balance is compared to the transfer amount to determine if there are enough reward points to complete the transaction request at 210. The transaction processing circuit 130 compares the reward account balance to the requested transfer amount. If the transaction processing circuit 130 determines that there are sufficient funds in the reward account, the transaction processing circuit 130 initiates the requested transaction at 212.

If there are sufficient reward points in the rewards account, the transaction is completed at 212. The transaction processing circuit 130 proceeds to complete the transaction request by facilitating the payment, transfer, etc., requested by the customer 116. For example, a transfer of 10,000 points from the customer 106 to a recipient is processed as a debit of 10,000 points from the customer's rewards account and a deposit of $100 to the recipient, as opposed to a first transaction that converts the 10,000 points into currency still held by the customer 106, and then a second transaction that transfers the currency from the customer 106 to the recipient.

Once the transaction is complete, the accounts of the customer are updated to reflect the transaction at 214. In some arrangements, the accounts are updated by the account management circuit 132. The account management circuit 132 communicates with the accounts database 134 and the reward accounts database 136 to update accounts stored therein. The account management circuit 132 receives the transaction details from the transaction processing circuit 132, including the account number and the transaction amount. The transaction amount may be wholly in reward points, wholly in currency (e.g., US dollars), or may be split between reward points and currency (e.g., following processes 216-220). The account number may be a rewards account number and/or a payment account (e.g., currency account) number. The account management circuit 130 uses the transaction amount information to update the referenced accounts (e.g., reward accounts, currency accounts) of the customer 106.

After the accounts of the customer 106 are updated to reflect the completed transaction, the transaction sequence is then ended at 222. The transaction sequence may be ended by the financial institution computing system 104 generating and transmitting a display screen confirming the completion of the transaction request. In some arrangements, the transaction processing circuit 130 may generate a message for display on the customer device 116 including a confirmation number related to the completion of the transaction.

If there are insufficient reward points in the rewards account, the customer is prompted to complete a split transaction using partial reward points and partial currency at 216. The transaction processing circuit 130 is configured to generate and transmit a prompt to the customer 106 (e.g., via the client application 148, via an ATM, via an online banking website, etc.) to request the customer 106 to indicate whether the customer 106 desires to complete the transaction using both reward points and currency. In some arrangements, the transaction processing circuit 130 sends the message to the customer device 116 (e.g., via the client application 148), where the message includes a notice that the rewards account has insufficient funds to complete the transaction using only reward points. In some arrangements, the message may include an available reward points balance.

The amount of reward points the customer desires to use is received at 218. In some arrangements, the transaction processing circuit 130 generates and transmits the message with a prompt for the customer 106 to enter a lower reward points amount to use instead of the originally requested reward points amount. In some arrangements, the message includes a cash remainder value, where the cash remainder value shows the amount of currency needed to cover the difference between the reward points amount entered and the transaction amount (e.g., transfer amount, bill pay amount, etc.). Accordingly, the customer 106 can view the amount needed to cover the remainder of the transaction that is not covered by reward points and make a determination of whether to proceed with the transaction.

In some arrangements, if the customer desires not to complete the transaction using a split between reward points and currency, the customer 106 may exit the banking portal (e.g., close the client application 148, retrieve card from ATM, close online banking website, select an exit option from the client application 148, ATM screen, or online banking website, etc.). The transaction sequence is then ended at 222.

If the customer enters a lesser reward points amount, the split transaction using reward points and currency is processed at 220. In some arrangements, the transaction processing circuit 130 processes the transaction request partially using reward points and partially using currency (e.g., US dollars). Accordingly, in some arrangements, the transaction processing circuit 130 is further configured to determine that sufficient funds are available to cover the cash remainder portion of the transaction. The transaction processing circuit 130 then completes the transaction by transferring the reward points and currency, paying a bill of the customer, etc. The rewards account and the currency account of the customer 106 are updated to reflect the completed transaction at 214. The transaction processing circuit 130 communicates the completed transaction details to the account management circuit 132 to update the accounts of the customer 106 to reflect the completed transaction. The transaction is then ended at 222 as described above.

Figure 4:
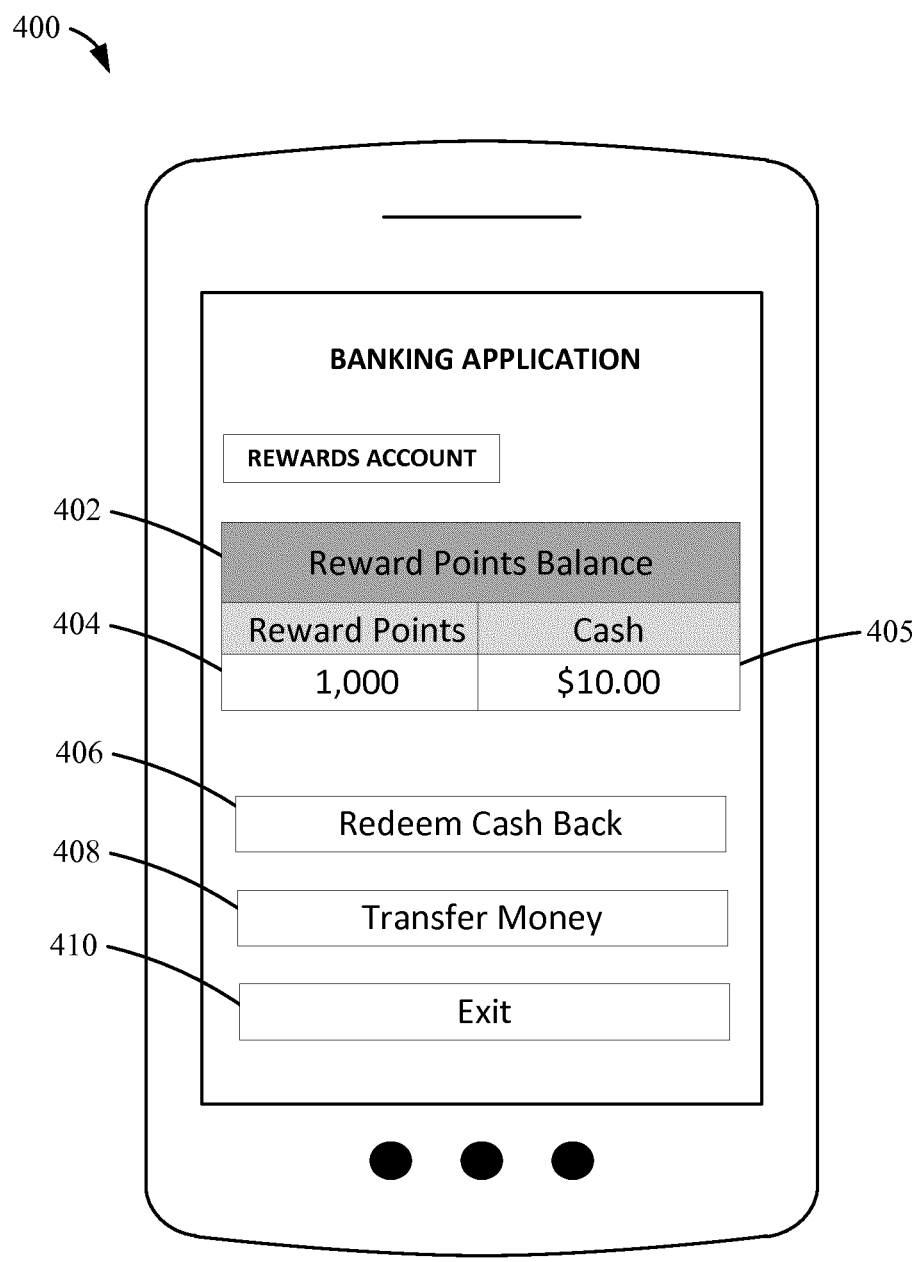

Referring to FIGS. 3-6, various user interfaces displayed by the system 100 are shown, according to example embodiments. The user interfaces may be displayed to the customer 106 on the customer device 116 (e.g., via the client application 148). The customer 106 first logs into the client application 148 or to a mobile banking website portal via the customer device 116 to access the banking portal. Through the banking portal, the customer 106 can select from a number of options relating to the customer's rewards account. The options include a "View Points Balance" selection 302, a "Transfer Money" selection 304, a "Pay Bill" selection 306, a "Purchase Merchandise" selection 308, and an "Exit" selection 310. If the customer 106 selects the "View Points Balance" selection 302, the user interface of the banking portal updates to display the customer's rewards points balance at 402 (as shown in FIG. 4). As shown in FIG. 4, the rewards point balance may also show a converted currency amount. For example, as shown the reward points balance is shown as 1,000 points at 404 and the converted currency amount is shown as $10.00 at 405. From the user interface displayed in FIG. 4, the customer 106 can select a "Redeem Cash Back" selection 406, a "Transfer Money" selection 408, or an "Exit" selection 410.

Figure 5:
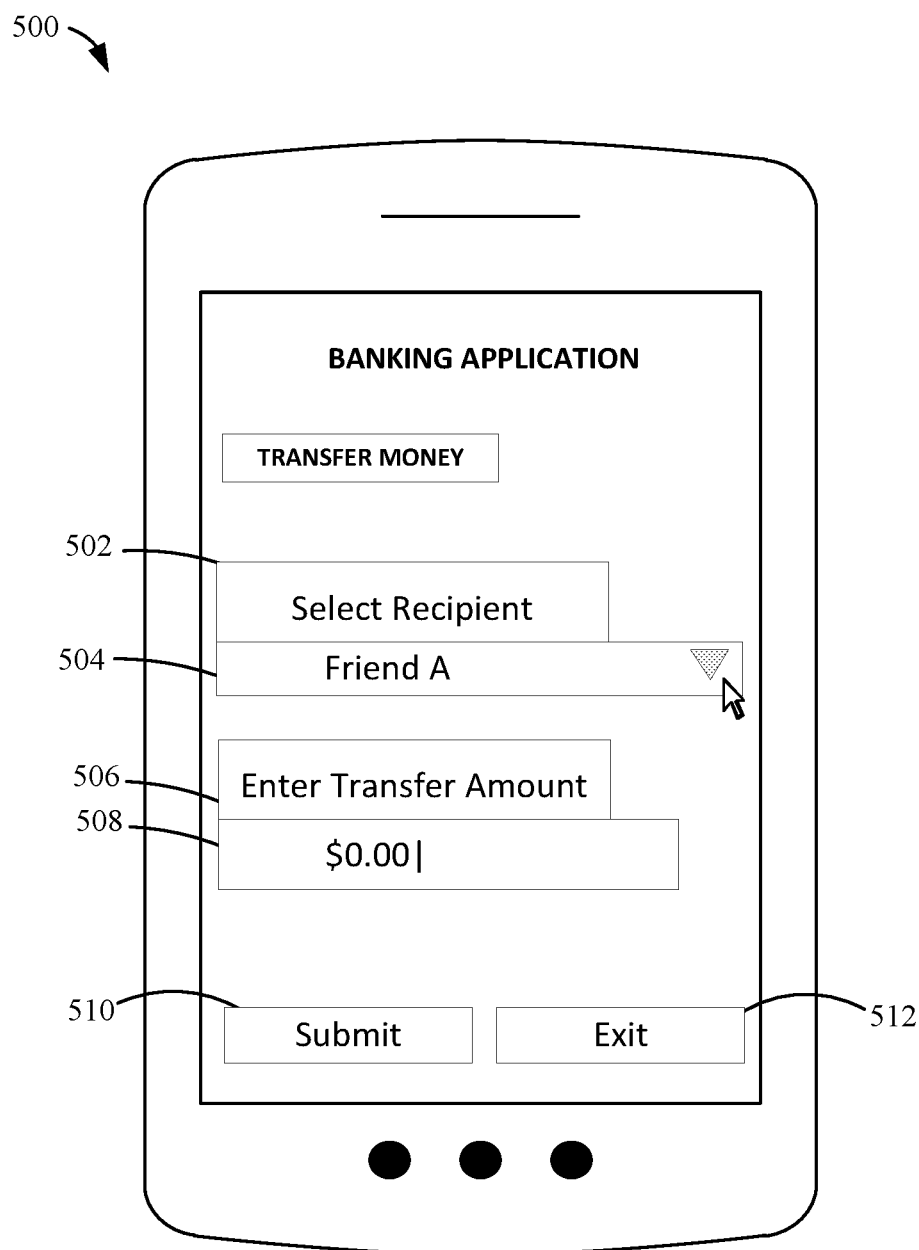
Figure 6:
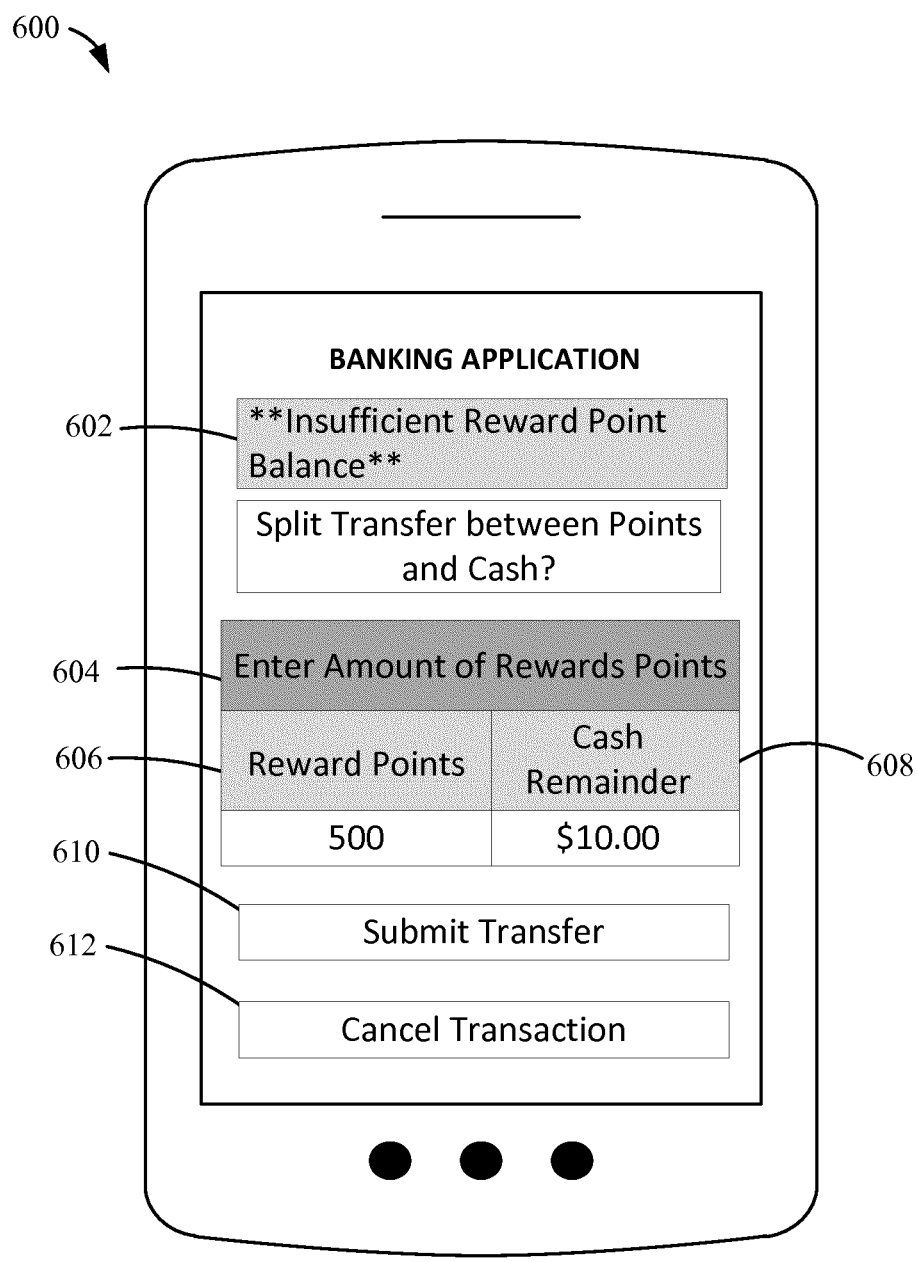

If the customer 106 selects the "Transfer Money" selection on either display 300 or 400 (e.g., Transfer Money selection 304, Transfer Money selection 408), the user interface of the banking portal updates to display a transfer details display 500 (as shown in FIG. 5). The transfer details display 500 allows the customer 106 to provide details regarding a transfer transaction to the financial institution computing system 104. The available options on display 500 are presented to the customer 106 as a series of selections 504, 508, 510, 512. When the customer 106 interacts with a given selection, the customer 106 can enter transfer transaction details, submit the transaction details, or exit the banking portal. The transfer transaction details may include any of recipient name, email address, phone number, transfer amount, or the like. For example, at 502, the customer 106 can select a recipient by name from a drop-down menu 504. The drop-down menu 504 can include recipient names, email addresses, phone numbers, account numbers, and the like. As a further example, the customer 106 can enter an amount to transfer to the recipient at 508. The transfer amount can be displayed in currency, as shown in FIG. 5, or can be displayed as reward points. Once the customer 106 has entered a transfer amount, the customer 106 can select the "Submit" selection 510 to transmit the transaction details to the financial institution computing system 104 for processing. Alternatively, the customer 106 can exit the banking portal by selecting "Exit" selection 512.

If the customer 106 selects the "Submit" selection 510 to complete the transfer transaction and the rewards account balance is insufficient to complete the transaction with only reward points, the user interface of the banking portal updates to display an insufficient reward points display 600. As shown, the insufficient reward points display 600 can display a user option 606 to input the number of rewards the customer 106 would like to use in place of the originally requested reward points amount. The display 600 generates and updates a cash remainder display 608 with every user reward points input instance. The cash remainder display 608 shows the amount of currency needed to cover the remainder of the transaction with the amount of points currently entered by the customer 106. For example, the customer 106 in this case has input 500 reward points and the display 600 has updated cash remainder display 608 indicating that an extra $10 is needed to cover the remainder of the transaction not covered by the 500 reward points. While viewing this information, the customer 106 can select the "Submit" selection 610 to complete the transaction using the currently entered partial reward points and partial currency information. Alternatively, the customer 106 can cancel the transaction request by selecting the "Cancel Transaction" selection 612.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A financial institution computing system associated with a financial institution, the system comprising:
   a network interface structured to facilitate data communication via a network;
   an accounts database structured to store information associated with accounts held by the financial institution, including a payment account associated with a customer;
   a rewards account database structured to store information associated with reward accounts held by the financial institution, including a rewards account associated with the customer; and
   a processing circuit comprising a processor and memory, the processing circuit structured to:
      receive a rewards transaction request associated with the rewards account, the rewards transaction request including a rewards amount and recipient details corresponding to a recipient account;
generate a display for the customer to enter a customer preferred rewards amount;
debit the customer preferred rewards amount of points from the rewards account maintained by the financial institution and associated with the customer, wherein the customer preferred rewards amount of points is less than or equal to the rewards amount;
determine a remainder rewards amount by subtracting the customer preferred rewards amount from the rewards amount;
debit the remainder rewards amount from a customer selected account held by the financial institution and associated with the customer; and
complete the rewards transaction as a single transaction without converting the rewards amount to currency by debiting the customer preferred rewards amount and depositing a currency value corresponding to the customer preferred rewards amount into the recipient account;
determine that the rewards amount is higher than a rewards balance in the rewards account;
generate and transmit an insufficient funds message including a notice to the customer that the rewards balance is too low to complete the rewards transaction for display and a prompt for the customer to enter a lower rewards amount;
receive the lower rewards amount from the customer device;
generate and transmit a cash remainder display to the customer device, wherein the cash remainder display indicates an amount of funds necessary to cover a remainder of the rewards transaction;
update the cash remainder display for each lower rewards amount received;
debit the amount of funds necessary to cover the remainder of the rewards transaction from the payment account associated with the customer.

2. The system of claim 1, wherein the processing circuit is further structured to:
determine that the rewards amount is less than or equal to a rewards balance in the rewards account.

3. The system of claim 1, wherein the rewards transaction includes a split transaction comprising a transfer of reward points and a transfer of currency.

4. The system of claim 1, wherein the recipient details include a recipient name and a recipient account number.

5. The system of claim 1, wherein the processing circuit is further structured to transmit a transaction confirmation to the customer device.

6. A method of performing a rewards transaction, the method comprising:
receiving, by a financial institution computing system, a rewards transaction request associated with a rewards account, the rewards transaction request including a rewards amount and recipient details corresponding to a recipient account;
generating a display for the customer to enter a customer preferred rewards amount;
debiting, by the financial institution computing system, the customer preferred rewards amount of points from the rewards account maintained by the financial institution and associated with the customer, wherein the customer preferred rewards amount of points is less than or equal to the rewards amount;
determining a remainder rewards amount by subtracting the customer preferred rewards amount from the rewards amount;
debiting the remainder rewards amount from a customer selected account held by the financial institution and associated with the customer; and
completing, by the financial institution computing system, the rewards transaction as a single transaction without converting the rewards amount to currency by debiting the customer preferred rewards amount and depositing a currency value corresponding to the customer preferred rewards amount into the recipient account;
determining, by the financial institution computing system, that the rewards amount is higher than the rewards balance in the rewards account;
generating and transmitting, by the financial institution computing system, an insufficient funds message including a notice to the customer that the rewards balance is too low to complete the rewards transaction and a prompt for the customer to enter a lower rewards amount;
receiving, by the financial institution computing system, the lower rewards amount from the customer device;
generating and transmitting, by the financial institution computing system, a cash remainder display to the customer device, wherein the cash remainder display indicates an amount of funds necessary to cover a remainder of the rewards transaction;
updating, by the financial institution computing system, the cash remainder display for each lower rewards amount received; and
debiting, by the financial institution computing system, the amount of funds necessary to cover the remainder of the rewards transaction from the payment account associated with the customer.

7. The method of claim 6, further comprising:
determining, by the financial institution computing system, that the rewards amount is less than or equal to a rewards balance in the rewards account.

8. The method of claim 6, wherein the rewards transaction includes a split transaction comprising a transfer of reward points and a transfer of currency.

9. The method of claim 6, wherein the recipient details include a recipient name and a recipient account number.

10. The method of claim 6, further comprising transmitting, by the financial institution computing system, a transaction confirmation to the customer device.

11. An apparatus comprising:
a transaction processing circuit included in a financial institution computing system associated with a financial institution, the transaction processing circuit configured to:
receive a rewards transaction request associated with a rewards account, the transaction request including a rewards amount and recipient details corresponding to a recipient account; and
an account management circuit configured to:
generate a display for the customer to enter a customer preferred rewards amount;
debit the customer preferred rewards amount of points from the rewards account maintained by the financial institution and associated with a customer, wherein the customer preferred rewards amount of points is less than or equal to the rewards amount;
determine a remainder rewards amount by subtracting the customer preferred rewards amount from the rewards amount;

debit the remainder rewards amount from a customer selected account held by the financial institution and associated with the customer; and complete the rewards transaction request as a single transaction without converting the rewards amount to currency by debiting the customer preferred rewards amount and depositing a currency value corresponding to the customer preferred rewards amount into the recipient account;

determine that the rewards amount is higher than the rewards balance in the rewards account;

generate and transmit an insufficient funds message including a notice to the customer that the rewards balance is too low to complete the rewards transaction and a prompt for the customer to enter a lower rewards amount;

receive the lower rewards amount from the customer device;

generate and transmit a cash remainder display to the customer device, wherein the cash remainder display indicates an amount of funds necessary to cover a remainder of the rewards transaction;

update the cash remainder display for each lower rewards amount received; and debit the amount of funds necessary to cover the remainder of the rewards transaction from a payment account associated with the customer.

12. The apparatus of claim 11, wherein the transaction processing circuit is further configured to:
determine that the rewards amount is less than or equal to a rewards balance in the rewards account.

13. The apparatus of claim 11, wherein the rewards transaction includes a split transaction comprising a transfer of reward points and a transfer of currency.

14. The apparatus of claim 11, wherein the recipient details include a recipient name and a recipient account number.

15. The apparatus of claim 11, wherein the transaction processing circuit is further configured to transmit a transaction confirmation to the customer device.

* * * * *